(12) United States Patent
Owen (10) Patent No.: US 12,397,873 B2
(45) Date of Patent: Aug. 26, 2025

(54) FOLDABLE SCOOTER

(71) Applicant: Anita Wu, Dongguan (CN)

(72) Inventor: Neil Owen, Dongguan (CN)

(73) Assignee: Anita Wu, Dongguan (CN)

( * ) Notice: Subject to any disclaimer, the term of this patent is extended or adjusted under 35 U.S.C. 154(b) by 457 days.

(21) Appl. No.: 17/973,293

(22) Filed: Oct. 25, 2022

(65) Prior Publication Data

US 2024/0132176 A1 Apr. 25, 2024
US 2024/0227971 A9 Jul. 11, 2024

(51) Int. Cl.
*B62K 15/00* (2006.01)
*B62K 3/00* (2006.01)

(52) U.S. Cl.
CPC ............ *B62K 15/008* (2013.01); *B62K 3/002* (2013.01)

(58) Field of Classification Search
CPC .... B62K 15/008; B62K 3/002; A63C 2203/10
See application file for complete search history.

(56) References Cited

U.S. PATENT DOCUMENTS

| | | | |
|---|---|---|---|
| 8,459,670 B1 * | 6/2013 | Tizzone | A63C 17/015 280/87.05 |
| 8,720,918 B2 * | 5/2014 | Liao | B62K 15/006 280/87.041 |
| 8,827,286 B2 * | 9/2014 | Woncik | A63C 17/0006 280/87.042 |
| 8,910,959 B2 * | 12/2014 | Alva | A63C 17/015 280/87.05 |
| 10,071,302 B2 * | 9/2018 | Sala | A63C 17/015 |
| 10,328,986 B2 * | 6/2019 | Koo | B62J 50/10 |
| 10,486,763 B2 * | 11/2019 | Koo | B62K 3/002 |
| 11,008,061 B2 * | 5/2021 | Newby | B62K 13/00 |
| 11,186,340 B2 * | 11/2021 | Park | B62K 3/002 |
| 11,851,126 B2 * | 12/2023 | Newby | B62K 3/002 |
| 2010/0044137 A1 * | 2/2010 | Atherton | B62K 3/002 180/223 |

(Continued)

FOREIGN PATENT DOCUMENTS

| | | | |
|---|---|---|---|
| CN | 114132420 A * | 3/2022 | ............ B62K 11/02 |
| KR | 102534254 B1 * | 5/2023 | |

(Continued)

*Primary Examiner* — Katy M Ebner
(74) *Attorney, Agent, or Firm* — Muncy, Geissler, Olds & Lowe, P.C.

(57) ABSTRACT

A foldable scooter is provided, including: a deck assembly, including a first deck and a second deck foldably connected and relatively rotatable about a first direction, the first deck including a first lock structure; a steering assembly, connected to the deck assembly; a locking assembly, mounted to the second deck, including a locking member movable between a first position and a second position in a second direction and including a second lock structure extending in the first direction and movable with the locking member; wherein when the locking member is located in the first position, the first and second lock structures are interlocked with each other in a male-female manner so that the deck assembly is non-foldable; when the locking member is located in the second position, the first and second lock structures are unlocked from each other so that the deck assembly is foldable.

13 Claims, 8 Drawing Sheets

(56) References Cited

U.S. PATENT DOCUMENTS

| | | | | |
|---|---|---|---|---|
| 2016/0114242 A1* | 4/2016 | Riley | ............... | A63C 17/12 |
| | | | | 180/233 |
| 2018/0118299 A1* | 5/2018 | Lu | ............... | B62K 15/008 |
| 2018/0161660 A1* | 6/2018 | Lu | ............... | A63C 17/01 |
| 2020/0047840 A1* | 2/2020 | Newby | ............... | B62K 21/12 |
| 2024/0132176 A1* | 4/2024 | Owen | ............... | B62K 15/006 |
| 2024/0382822 A1* | 11/2024 | Moore | ............... | A63C 17/12 |
| 2025/0050965 A1* | 2/2025 | Roh | ............... | B62K 15/00 |

FOREIGN PATENT DOCUMENTS

| | | | | |
|---|---|---|---|---|
| KR | 20240054688 A | * | 4/2024 | |
| WO | WO-9900290 A1 | * | 1/1999 | ......... A63C 17/016 |

\* cited by examiner

FOLDABLE SCOOTER

BACKGROUND OF THE INVENTION

Field of the Invention

The present invention relates to a foldable scooter.

Description of the Prior Art

The scooter is another product of skateboarding besides the skateboard. For easy storage, some conventional scooters are foldable. The conventional foldable scooter generally includes a deck assembly, a first steering assembly and a second steering assembly, one end of the deck assembly is provided with a front wheel and connected to the first steering assembly, and another end of the deck assembly is provided with a rear wheel. In some of the conventional scooters, the first steering assembly and the second steering assembly may be foldably connected to each other.

However, the conventional foldable scooter can just be folded at a position near the deck assembly which is non-foldable, which makes the folded size of the scooter large and requires large space for storing. Besides, the conventional foldable scooter is provided with no self-locking function so that the folded scooter can unfold easily under an external impact.

The present invention is, therefore, arisen to obviate or at least mitigate the above-mentioned disadvantages.

SUMMARY OF THE INVENTION

The main object of the present invention is to provide a foldable scooter which is foldable to reduce the size thereof and easy to carry and store.

To achieve the above and other objects, a foldable scooter is provided, including: a deck assembly, including a first deck and a second deck which are foldably connected to each other and relatively rotatable about a first direction, the first deck including a first lock structure arranged in the first direction; a steering assembly, connected to the deck assembly; a locking assembly, mounted to the second deck, including a locking member movable between a first position and a second position in a second direction transverse to the first direction and including a second lock structure extending in the first direction and movable with the locking member in the second direction; wherein when the locking member is located in the first position, the first lock structure and the second lock structure are interlocked with each other in a male-female manner along the first direction so that the deck assembly is non-foldable; when the locking member is located in the second position, the first lock structure and the second lock structure are unlocked from each other so that the deck assembly is foldable.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
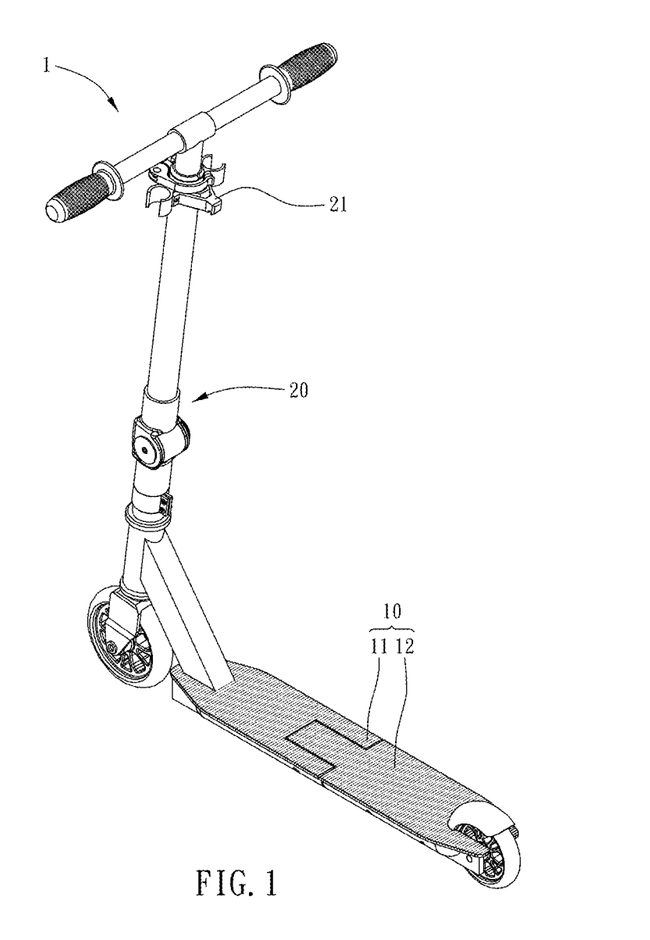
FIG. 1 is a stereogram of a preferable embodiment of the present invention.
Figure 2:
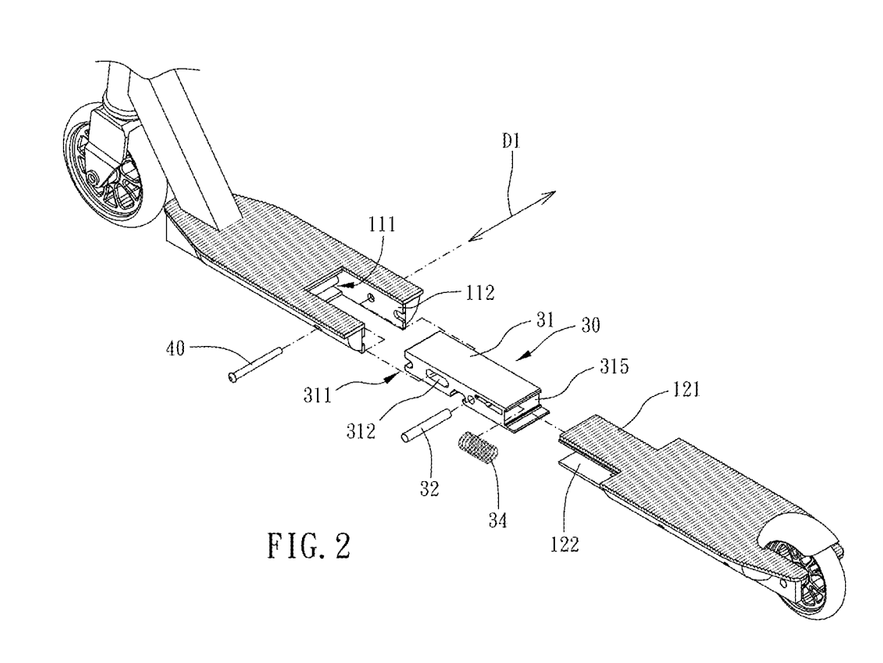
FIG. 2 is a breakdown drawing of a preferable embodiment of the present invention.
Figure 3:
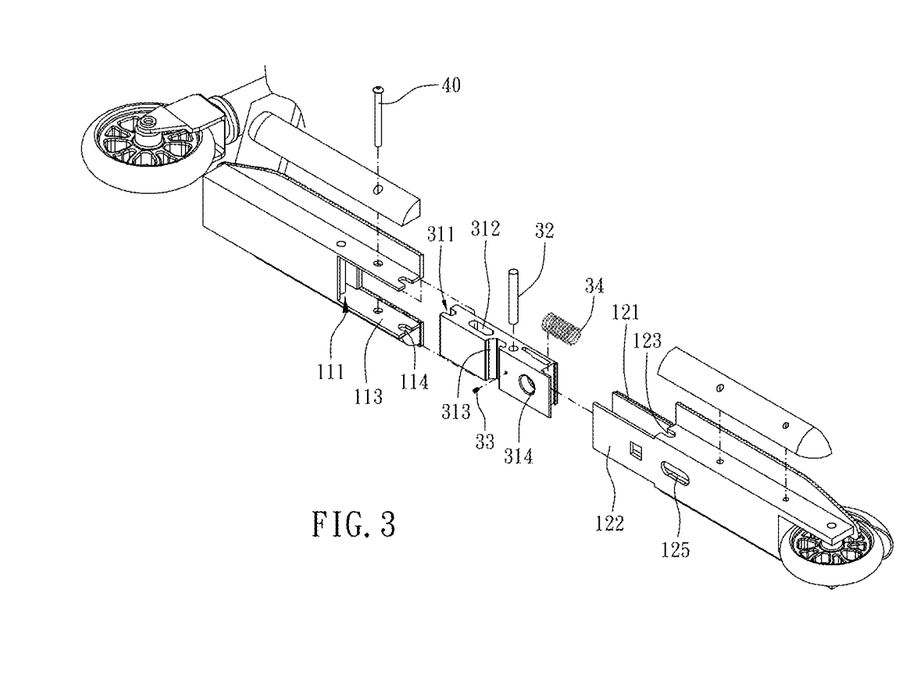
FIG. 3 is another breakdown drawing of a preferable embodiment of the present invention.
Figure 4:
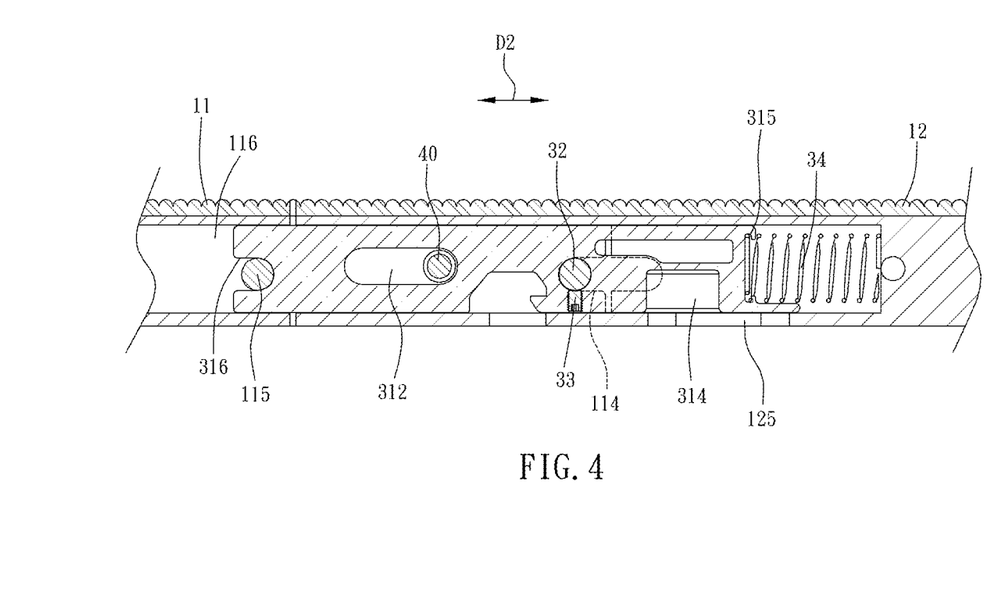
FIG. 4 is a drawing showing a deck assembly in a locked state according to a preferable embodiment of the present invention.
Figure 5:
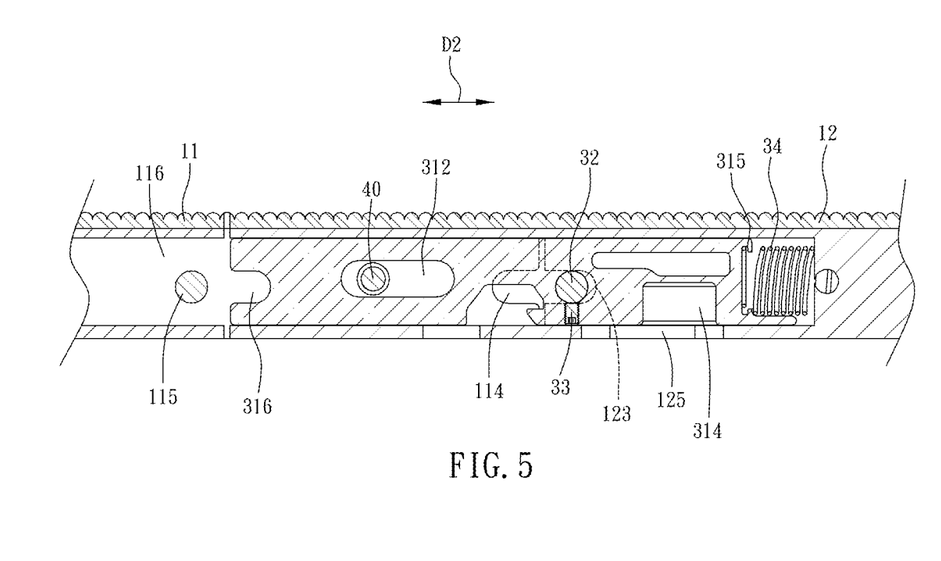
FIG. 5 is a drawing showing the deck assembly in an unlocked state according to a preferable embodiment of the present invention.
Figure 6:
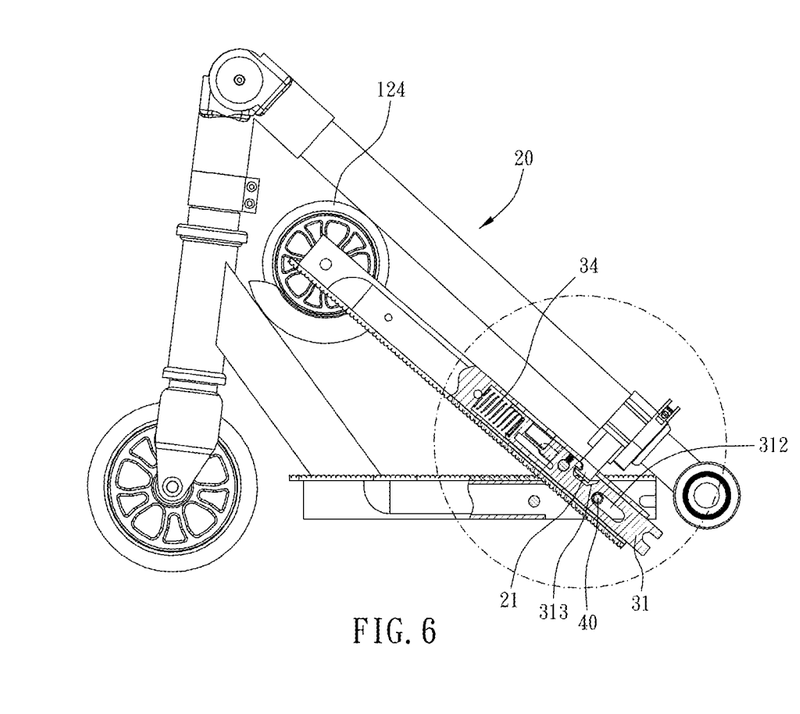
FIG. 6 is a drawing showing a foldable scooter in a folded state according to a preferable embodiment of the present invention.
Figure 7:
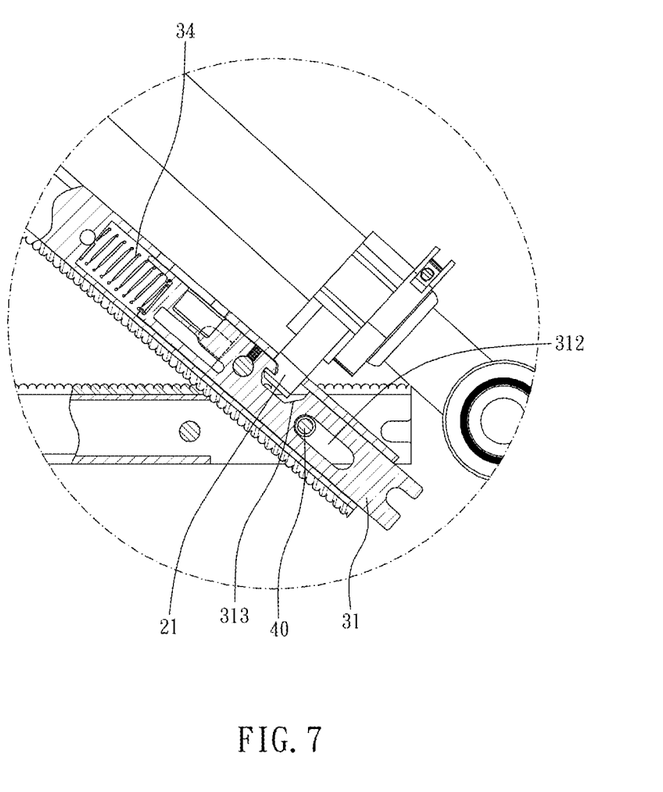
FIG. 7 is a partial enlargement of FIG. 6.
Figure 8:
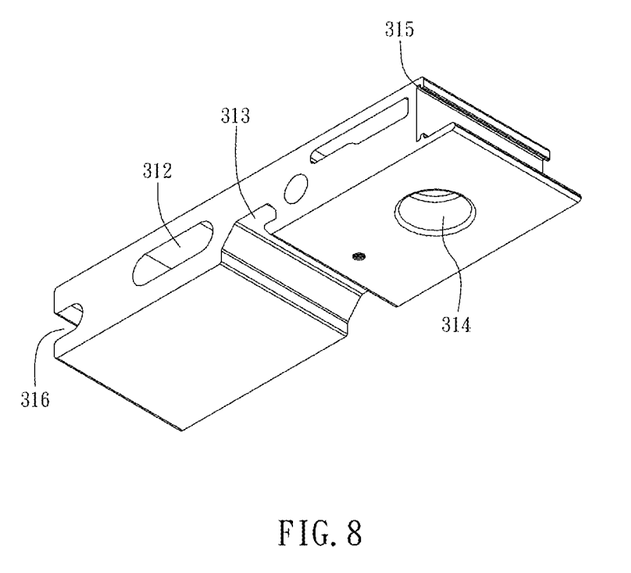
FIG. 8 is a stereogram of a locking member according to a preferable embodiment of the present invention.

Please refer to FIGS. 1 to 8 for a preferable embodiment of the present invention. A foldable scooter 1 of the present invention includes a deck assembly 10, a steering assembly 20 and a locking assembly 30.

The deck assembly 10 includes a first deck 11 and a second deck 12 which are foldably connected to each other and relatively rotatable about a first direction D1. The first deck 11 includes a first lock structure 111 arranged in the first direction D1. The steering assembly 20 is connected to the deck assembly 10. The locking assembly 30 is mounted to the second deck 12, and the locking assembly 30 includes a locking member 31 movable between a first position (FIG. 4) and a second position (FIG. 5) in a second direction D2 transverse to the first direction D1, and the locking assembly 30 includes a second lock structure 311 extending in the first direction D1 and movable with the locking member 31 in the second direction D2. When the locking member 31 is located in the first position, the first lock structure 111 and the second lock structure 311 are interlocked with each other in a male-female manner along the first direction D1 so that the deck assembly 10 is non-foldable. When the locking member 31 is located in the second position, the first lock structure 111 and the second lock structure 311 are unlocked from each other so that the deck assembly 10 is foldable. Whereby, the foldable scooter can be folded to reduce the size thereof, and it is easy to carry and store.

The first deck 11 further includes an upper slot 112 and a lower slot 113, the second deck 12 includes an upper plate 121 and a lower plate 122, and when the locking member 31 is located in the first position, the upper plate 121 and the lower plate 122 are inserted in the upper slot 112 and the lower slot 113, respectively.

The locking member 31 further includes a through hole 312 disposed therethrough in the first direction D1, and a shaft 40 by which the first deck 11 and the second deck 12 are foldably connected is mounted to the first deck 11 and disposed through the through hole 312. As such, the shaft 40 is relatively movable along the through hole 312 in the second direction D2 so that the locking member 31 can be moved to disengage the second lock structure 311 from the first lock structure 111.

Preferably, a latch pin 32 extending in the first direction D1 is mounted to the locking member 31, two sidewalls of the first deck 11 arranged oppositely in the first direction D1 each include a notch 114, and when the locking member 31 is located in the first position, the latch pin 32 is engaged in the notches 114 of the two sidewalls of the first deck 11, which enhances the reliability, stability and structural strength of the locked configuration of the first deck 11 and the second deck 12. In other embodiment, the latch pin 32 and the locking member 31 may be formed of one piece. A fastener 33 is screwed to the locking member 31 and abutted radially against the latch pin 32 to firmly secure the latch pin 32. Two sidewalls of the second deck 12 arranged oppositely in the first direction D1 each include a notch 123, and when the locking member 31 is located in the second position, the latch pin 32 is located within the notches 123 of the two sidewalls of the second deck 12. The notches 123 can guide the latch pin 32 and control the travel distance of the latch pin 32 for sufficiently disengaging the second lock structure 311 from the first lock structure 111.

The steering assembly 20 may be connected to either of the two decks. In this embodiment, the steering assembly 20 is connected to the first deck 11, the second deck 12 is foldable to be directed toward a lower portion of the steering assembly 20 and to be located between an upper portion of the steering assembly 20 and the first deck 11, and thus the foldable scooter can be very compact.

Preferably, the steering assembly 20 includes a buckle member 21 (such as a hook or the like), the locking member 31 includes a recess 313, and the steering assembly 20 is foldable so that the buckle member 21 is releasably buckled in the recess 313 and the second deck 12 is restricted between the steering assembly 20 and the first deck 11. The second deck 12 is provided with a wheel 124, and the wheel 124 contacts the steering assembly 20 when the buckle member 21 is buckled in the recess 313, for conducing a stable folded configuration. The second deck 12 encompasses the locking member 31 and includes an opening 125, the locking member 31 further includes another recess 314 corresponding to the opening 125, and in the second direction D2 the opening 125 has an extent larger than an extent of the recess 314 so that the locking member 31 can be moved by one or more fingers through the opening 125.

The locking assembly 30 further includes an elastic member 34 disposed between the second deck 12 and the locking member 31. When the locking member 31 is located in the first position, the elastic member 34 biases the locking member 31 so that the second lock structure 311 is urged and abutted on the first lock structure 111 to ensure the interlocking of the first lock structure 111 and the second lock structure 311. When the buckle member 21 is inserted in the recess 313, the elastic member 34 biases the locking member 31 to urge and restrict the buckle member 21. In this embodiment, the elastic member 34 is a coil spring, the locking member 31 further includes a C-shaped groove 315 extending in the first direction D1, and an end of the coil spring is blocked and engaged in the C-shaped groove 315. As such, the coil spring can be quickly and reliably connected to the locking member 31.

The locking member 31 is slidably received within the second deck 12, one of the first lock structure 111 and the second lock structure 311 includes a shaft 115 extending in the first direction D1, and the other of the first lock structure 111 and the second lock structure 311 includes a groove 316 extending in the first direction D1 within which the shaft 115 is releasably engaged in the second direction D2. In this embodiment, the first lock structure 111 includes the shaft 115, and the second lock structure 311 includes the groove 316.

Preferably, the first deck 11 further includes a chamber 116. When the locking member 31 is located in the first position, the first lock structure 111 is located in the chamber 116, the locking member 31 retractably projects out beyond the second deck 12 so that the second lock structure 311 is inserted in the chamber 116, and an interior wall of the chamber 116 encompasses an end of the locking member 31, which enhances the reliability, stability and structural strength of the locked configuration of the first deck 11 and the second deck 12.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A foldable scooter, including:
 a deck assembly, including a first deck and a second deck which are foldably connected to each other and relatively rotatable about a first direction, the first deck including a first lock structure arranged in the first direction;
 a steering assembly, connected to the deck assembly; and
 a locking assembly, mounted to the second deck, including a locking member movable between a first position and a second position in a second direction transverse to the first direction and including a second lock structure extending in the first direction and movable with the locking member in the second direction;
 wherein when the locking member is located in the first position, the first lock structure and the second lock structure are interlocked with each other in a male-female manner along the first direction so that the deck assembly is non-foldable; when the locking member is located in the second position, the first lock structure and the second lock structure are unlocked from each other so that the deck assembly is foldable;
 wherein the steering assembly is connected to the first deck, and the second deck is foldable to be directed toward the steering assembly and to be located between the steering assembly and the first deck;
 wherein the steering assembly includes a buckle member, the locking member includes a recess, and the steering assembly is foldable so that the buckle member is releasably buckled in the recess and the second deck is restricted between the steering assembly and the first deck.

2. The foldable scooter of claim 1, wherein the second deck is provided with a wheel, and the wheel contacts the steering assembly when the buckle member is buckled in the recess.

3. The foldable scooter of claim 1, wherein the locking assembly further includes an elastic member disposed between the second deck and the locking member; when the buckle member is inserted in the recess, the elastic member biases the locking member to urge and restrict the buckle member.

4. The foldable scooter of claim 1, wherein the locking assembly further includes an elastic member disposed between the second deck and the locking member; when the locking member is located in the first position, the elastic member biases the locking member so that the second lock structure is urged and abutted on the first lock structure.

5. The foldable scooter of claim 1, wherein the first deck further includes an upper slot and a lower slot, the second deck includes an upper plate and a lower plate, and when the locking member is located in the first position, the upper plate and the lower plate are inserted in the upper slot and the lower slot, respectively.

6. The foldable scooter of claim 1, wherein the locking member further includes a through hole disposed therethrough in the first direction, a shaft by which the first deck and the second deck are foldably connected is mounted to the first deck and disposed through the through hole, and the shaft is relatively movable along the through hole in the second direction.

7. The foldable scooter of claim 1, wherein the locking assembly further includes an elastic member which is a coil spring and disposed between the second deck and the locking member, the locking member further includes a C-shaped groove extending in the first direction, an end of the coil spring is blocked and engaged in the C-shaped groove.

8. The foldable scooter of claim 1, wherein the second deck encompasses the locking member and includes an opening, the locking member further includes another recess corresponding to the opening, and in the second direction the opening has an extent larger than an extent of the another recess.

9. A foldable scooter, including:
a deck assembly, including a first deck and a second deck which are foldably connected to each other and relatively rotatable about a first direction, the first deck including a first lock structure arranged in the first direction;
a steering assembly, connected to the deck assembly; and
a locking assembly, mounted to the second deck, including a locking member movable between a first position and a second position in a second direction transverse to the first direction and including a second lock structure extending in the first direction and movable with the locking member in the second direction;
wherein when the locking member is located in the first position, the first lock structure and the second lock structure are interlocked with each other in a male-female manner along the first direction so that the deck assembly is non-foldable; when the locking member is located in the second position, the first lock structure and the second lock structure are unlocked from each other so that the deck assembly is foldable;
wherein the locking member is slidably received within the second deck, one of the first lock structure and the second lock structure includes a shaft extending in the first direction, and the other of the first lock structure and the second lock structure includes a groove extending in the first direction within which the shaft is releasably engaged in the second direction.

10. The foldable scooter of claim 9, wherein the first deck further includes a chamber, the first lock structure is located in the chamber, the locking member retractably projects out beyond the second deck so that the second lock structure is inserted in the chamber, and an interior wall of the chamber encompasses an end of the locking member.

11. A foldable scooter, including:
a deck assembly, including a first deck and a second deck which are foldably connected to each other and relatively rotatable about a first direction, the first deck including a first lock structure arranged in the first direction;
a steering assembly, connected to the deck assembly; and
a locking assembly, mounted to the second deck, including a locking member movable between a first position and a second position in a second direction transverse to the first direction and including a second lock structure extending in the first direction and movable with the locking member in the second direction;
wherein when the locking member is located in the first position, the first lock structure and the second lock structure are interlocked with each other in a male-female manner along the first direction so that the deck assembly is non-foldable; when the locking member is located in the second position, the first lock structure and the second lock structure are unlocked from each other so that the deck assembly is foldable;
wherein a latch pin extending in the first direction is mounted to the locking member, two sidewalls of the first deck arranged oppositely in the first direction each include a notch, and when the locking member is located in the first position, the latch pin is engaged in the notches of the two sidewalls of the first deck.

12. The foldable scooter of claim 11, wherein a fastener is screwed to the locking member and abutted radially against the latch pin.

13. The foldable scooter of claim 11, wherein two sidewalls of the second deck arranged oppositely in the first direction each include a notch, and when the locking member is located in the second position, the latch pin is located within the notches of the two sidewalls of the second deck.

* * * * *